No. 697,732. Patented Apr. 15, 1902.
G. LINHARD.
DRAFT EQUALIZER.
(Application filed Nov. 23, 1901.)
(No Model.)
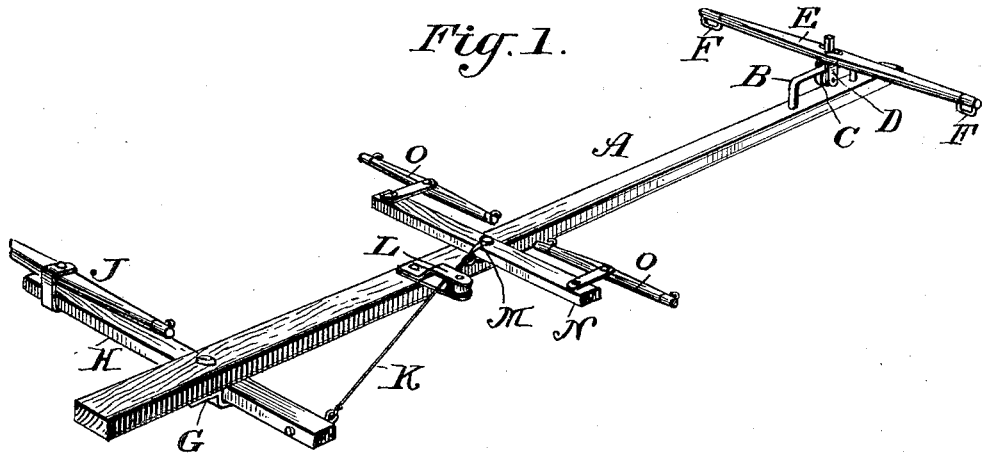
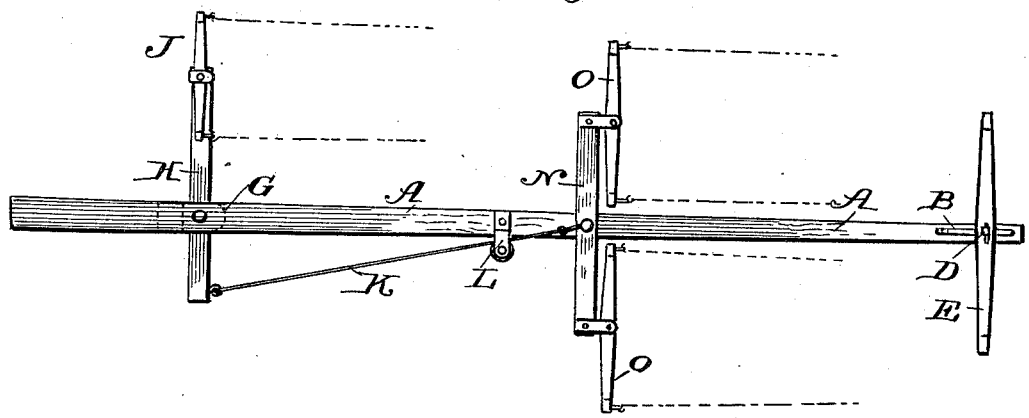
WITNESSES:
Jos. A. Ryan
INVENTOR
George Linhard.
BY 
ATTORNEY

UNITED STATES PATENT OFFICE.

GEORGE LINHARD, OF SUBLETTE, MISSOURI.

DRAFT-EQUALIZER.

SPECIFICATION forming part of Letters Patent No. 697,732, dated April 15, 1902.

Application filed November 23, 1901. Serial No. 83,414. (No model.)

*To all whom it may concern:*

Be it known that I, GEORGE LINHARD, a citizen of the United States, residing at Sublette, in the county of Adair and State of Missouri, have invented certain new and useful Improvements in Draft-Equalizers, of which the following is a specification, reference being had therein to the accompanying drawings.

My invention relates to improvements in draft-equalizers; and the oject of my invention is the provision of a practical and thoroughly-efficient draft-equalizer which can be produced at a comparatively low price.

With this object in view my invention consists of a draft-equalizer embodying novel features of construction and combination of parts substantially as disclosed herein.

Figure 1 represents a perspective view of my draft-equalizer, and Fig. 2 represents a plan view showing the horses in position to the draft-equalizer.

A designates the pole or shaft which is attached to the machine to be drawn, which may be a reaper, harvester, binder, or a vehicle of any character to be drawn by three horses, and at the forward end of the pole is the guide bail or staple B, upon which rides the friction-roller C, carried by the bracket D, which is secured centrally of the neck-yoke E, which has means F to be attached to two horses, one on each side of the pole, as is evident.

On the under side near the inner end of the pole in the bracket G is pivoted the cross-piece H, which is pivoted so as to have the outer short arm and the inner long arm, to the said long arm being pivoted at its end the whiffletree J, and leading from the outer short arm is the rod or chain K, which passes through the roller-guide bracket L and has its end connected to the staple or bail M, to which is pivoted the cross-bar N, having connected to each of its ends the singletree O and O.

From this construction it will be seen that the evener or equalizer accommodates three horses, one being hitched to the singletree on the long arm of the cross-piece and the other two being hitched one on each side of the pole to the singletrees on the cross-bar and to the neck-yoke at the end of the pole, and it is evident that this arrangement of the horses distributes the draft and strain in an even and proper manner.

I claim—

In a draft-evener, the combination with the pole carrying the loose neck-yoke at its forward end, the cross-piece pivoted near the inner end of the pole to provide a long and short arm, the singletree mounted on the long arm, the connection leading from the short arm, the hinged guide for said connection carrying a roller-bearing, a cross-bar connected centrally to said connection, and a pair of singletrees carried by said cross-bar.

In testimony whereof I affix my signature in presence of two witnesses.

GEORGE LINHARD.

Witnesses:
J. M. KENNEDY,
J. O. SIGLER.